United States Patent [19]

Bryant

[11] 4,325,922

[45] Apr. 20, 1982

[54] TREATMENT OF HIGH-TEMPERATURE STACK GASES CONTAINING CONDENSABLE BORON COMPOUNDS

[75] Inventor: Mark A. Bryant, Columbus, Ohio

[73] Assignee: United McGill Corporation, Groveport, Ohio

[21] Appl. No.: 194,789

[22] Filed: Oct. 7, 1980

Related U.S. Application Data

[63] Continuation of Ser. No. 86,133, Oct. 18, 1979, abandoned.

[51] Int. Cl.$^3$ .............................................. B01D 53/34
[52] U.S. Cl. ................................... 423/210; 423/240; 423/242; 423/277; 423/279; 423/280
[58] Field of Search ............... 423/210 R, 240, 242 A, 423/277, 279, 280, 282

[56] References Cited

U.S. PATENT DOCUMENTS 3,995,005  11/1976  Teller .................... 423/210

FOREIGN PATENT DOCUMENTS 51-42099  4/1976  Japan .................... 423/210

Primary Examiner—Earl C. Thomas
Attorney, Agent, or Firm—LeBlanc, Nolan, Shur & Nies

[57] ABSTRACT

High-temperature stack gases contaminated with condensable boron oxides or boric acids are processed to ecologically-acceptable effluent gases by the steps of:

(a) cooling the stack gases to a temperature above about 250° F. and converting condensable boron oxides and boric acids to non-volatile boron compounds by spraying the stack gases with an aqueous solution of a strong base;

(b) collecting and removing the thus-formed non-volatile boron compounds from the cooled gases and (c) venting the resulting ecologically-acceptable effluent gases to the atmosphere.

8 Claims, 2 Drawing Figures

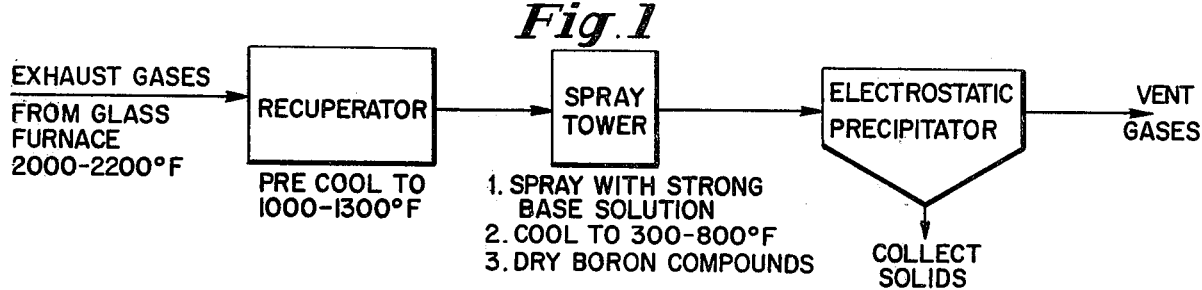
Fig. 1
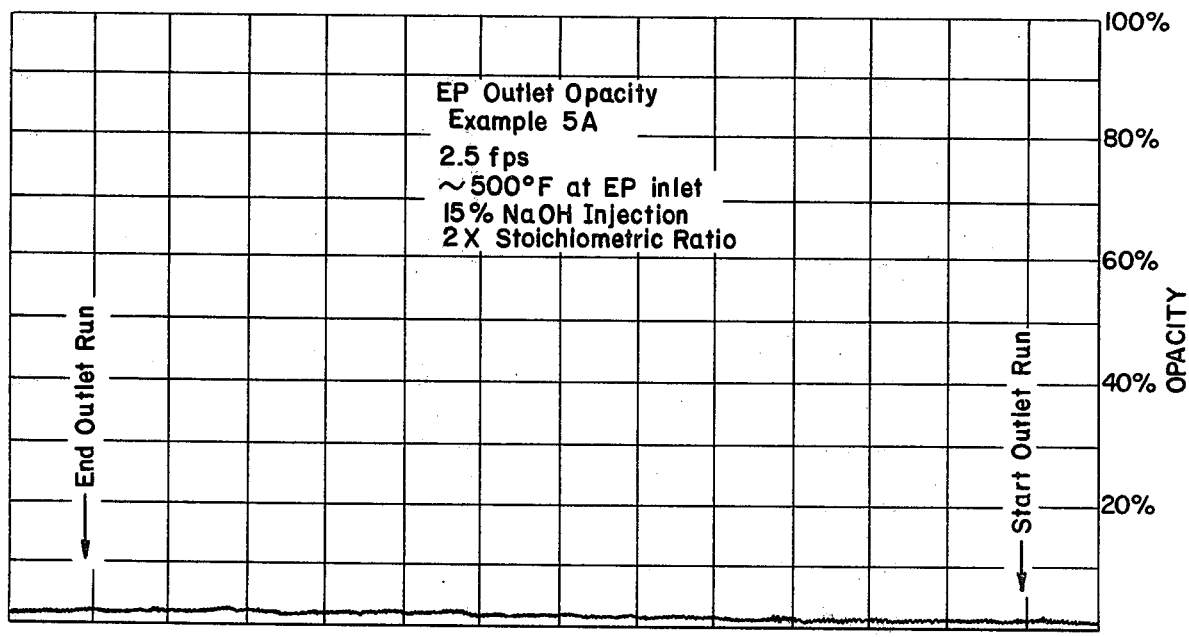
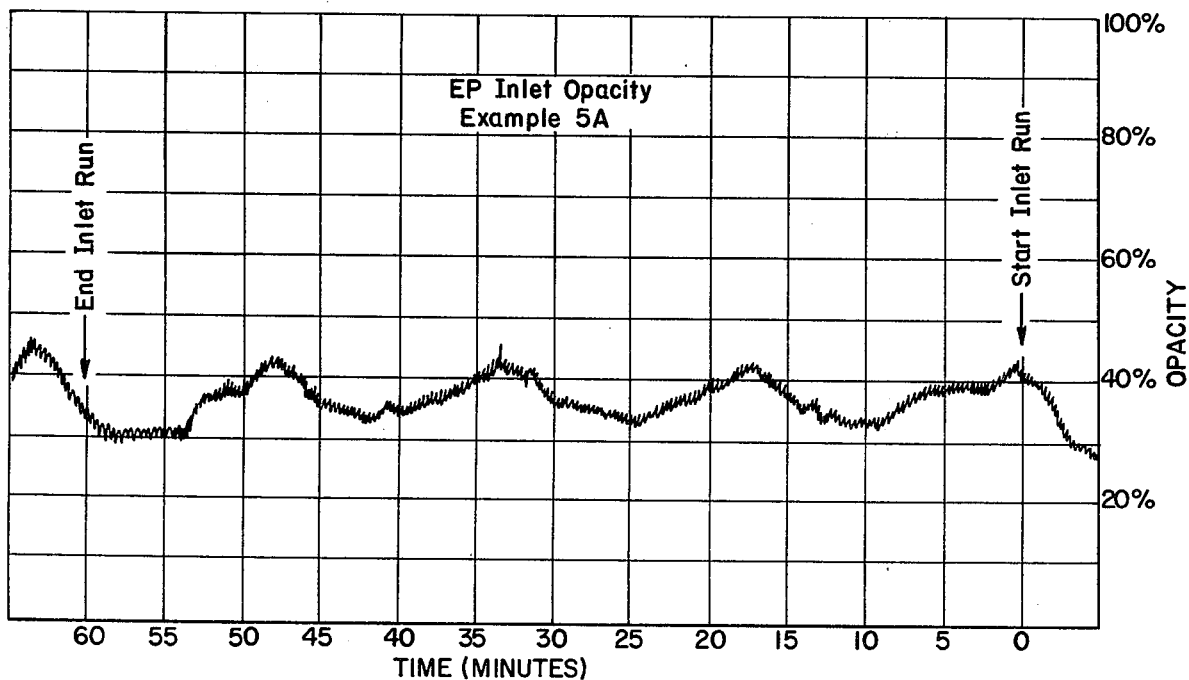

TREATMENT OF HIGH-TEMPERATURE STACK GASES CONTAINING CONDENSABLE BORON COMPOUNDS

CROSS-REFERENCE TO RELATED APPLICATION

This application is a continuation of application Ser. No. 86,133 filed Oct. 18, 1979, and now abandoned.

BACKGROUND OF THE INVENTION

This invention relates to a method and apparatus for the removal of boric acids or boron oxides from high-temperature stack gases to produce an effluent gas having boron and particulate levels with environmentally-acceptable properties.

Effluents from industrial processes, such as glass furnaces, can contain three types of air pollutants:

(a) dust, i.e. solid particulates of very small particle size (b) permanent gases, e.g., $SO_2$ or HF (c) condensables, i.e. compounds which are in the gaseous state above a certain temperature, but which condense to a liquid or solid at lower temperatures.

Condensables, of which boron oxides or the corresponding acids are exemplary, are troublesome because, at high temperatures, they can pass through the particulate collection means of an effluent-treating system in the form of a vapor and condense in the atmosphere. Condensables characteristically form a detached plume, that is, a visible, persistent cloud which is dispersible only by dilution, at some distance from the stack.

All air quality standards, whether promulgated by state or national regulatory authorities set forth a requirement for particulate collection. This requirement can be met by fabric collectors (baghouses), electrostatic precipitators or scrubbers. Scrubbers are less than acceptable because the scrubber effluent may, without after-treatment, result in water pollution as a trade-off for air pollution. Accordingly, it may be preferred to collect particulate solids as a dry dust. For use of a baghouse, the particulates must be dry. When an electrostatic precipitator is used, it is preferred, but not absolutely required, that the particulates be dry.

Flue gases from glass making or melting furnaces, such as those used for the production of fiber glass, typically contain boron oxides and particulates, possibly admixed with small amounts of $SO_2$, fluorides and nitrogen oxides.

In a prior art process for the removal of boron compounds from stack gases, disclosed by Teller in U.S. Pat. No. 3,995,005, it is taught that boron oxides exposed to moisture appear to hydrolyze to boric acid. Boric acid has a measurable vapor pressure at effluent gas temperatures generally considered acceptable. As a result, boric acid in gaseous form escapes from the recovery system and is exhausted to the atmosphere. In such systems a white plume of boric acid is formed by condensation of the effluent gases as the effluent stream hits the cooler atmosphere outside the treatment plant. It has been proposed by Teller to remove particulates and boron oxides by first cooling the effluent gases to about 170°–175° F. to condense boron oxides or boric acids and then removing the particulates by a baghouse filter.

The vapor pressure of boron hydrates and the vaporization mechanism of boron oxide hydrates has been elucidated by Petropavlovskii et al., abstracted in *Chemical Abstracts*, vol. 71, 116797k (1969) and vol. 72, 59386v (1970).

Removal of $B_2O_3$ from exhaust gases of boron-containing fuels by wet scrubbing has been proposed by Hein et al., *J. Air Pollution Control Association*, vol. 11, 205–19 (1961), abstracted in *Chemical Abstracts*, vol. 55, 16964g (1961). A high collection efficiency was achieved, but the process was thought to be of limited industrial applicability because of high pressure loss and high ratio of scrubbing and cooling water to gas.

It will be apparent that present technology for the removal of boron compounds from stack gases is limited to methods in which boron acids or oxides are condensed at temperatures below about 300° F. and that this technology requires large volumes of dilution air and consequently large apparatus for treating effluent streams. Moreover, the temperatures employed are below the dewpoint of corrosive components which may be contained in the effluent stream.

OBJECT OF THE INVENTION

It is the object of this invention to provide a process for the removal of boron oxides and boric acids from high temperature effluent gases which process includes converting boron oxides and boric acids to solids, such as borates, at temperatures higher than about 250° F.

SUMMARY OF THE INVENTION

In one aspect, the process of this invention provides a process for treating high-temperature stack gases to remove condensable boron oxides or boric acids therefrom and to produce ecologically-acceptable effluent gases comprising the steps of:

(a) cooling the stack gases to a temperature above about 250° F. and converting condensable boron oxides and boric acids to non-volatile boron compounds by spraying the stack gases with an aqueous solution of a strong base;

(b) collecting and removing the thus-formed non-volatile boron compounds from the cooled gases and (c) venting the resulting ecologically-acceptable effluent gases to the atmosphere.

In another aspect, this invention relates to an apparatus for treatment of high-temperature boron-containing stack gases, comprising:

(a) means for cooling the stack gases to a temperature above about 250° F. and converting condensable boron oxides and boric acids to non-volatile boron compounds;

(b) duct means for transferring stack gases cooled to above about 250° F. and non-volatile boron compounds formed in (a) to means for collecting and removing non-volatile boron compounds;

(c) means for collecting and removing non-volatile boron compounds; and (d) means for venting the ecologically-acceptable effluent gases to the atmosphere.

BRIEF DESCRIPTION OF THE DRAWING

In FIG. 1 is shown a diagrammatic representation of a preferred embodiment of the invention.

In FIG. 2 is given comparative opacity data for effluent gas prior to and after treatment in accordance with Example 5A.

DETAILED DESCRIPTION

The process of this invention is applicable to treatment of high-temperature gases containing ecologically-objectionable quantities of condensable boron compounds, whether in the form of boron oxide ($B_2O_3$), metaboric acid ($HBO_2$) or its trimer ($HBO_2)_3$ or orthoboric acid ($H_3BO_3$).

Typically, high amounts of boron compounds are present in the effluent from glass making furnaces. The effluent gas is typically at a temperature of 2000°–2200° F. and contains boron concentrations (as elemental boron) as high as 300–500 mg./Nm$^3$ or up to 0.2 gr./scfdg. It will be understood that the definition of an acceptable effluent gas can change as a result of rule making or decisions by regulatory authorities, but current standards limit effluent content to the order of less than 65 mg./Nm$^3$ as elemental boron, which upper limit is preferred for ecologically-acceptable gases produced by the process of this invention.

In the first step of the process of this invention, hot boron-containing stack gases are passed through an apparatus in which the gases are sprayed with an aqueous solution of a strong base. "Strong base," as used in the specification includes NaOH and KOH and mixtures thereof with $Ca(OH)_2$. Also included within the scope of strong bases are reactive compositions which form NaOH or KOH, particularly mixtures of $Na_2CO_3$ and $Ca(OH)_2$. The preferred base is NaOH.

It is proposed that when the hot boron-containing gases contact the aqueous solution of strong base, using NaOH solution as exemplary, the gas is cooled by heat of vaporization of water and boron oxides are dissolved in the remaining spray droplets, in which the following reactions are thought to occur:

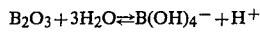

$$B_2O_3 + 3H_2O \rightleftharpoons B(OH)_4^- + H^+$$

$$HBO_2 + 2H_2O \rightleftharpoons B(OH)_4^- + H^+$$

$$H_3BO_3 + H_2O \rightleftharpoons B(OH)_4^- + H^+$$

Whereas $H_3BO_3$ in solution is volatile, the $B(OH)_4^-$ ion is not. Therefore, the function of a strong base such as NaOH in the water solution is to hold the hydrogen ion concentration at a very low level. The law of mass action causes most of the boron in the solution to exist as $B(OH)_4^-$ and very little to exist as volatile $H_3BO_3$. In this manner the boron is prevented from vaporizing into the flue gas.

The overall reaction may be summarized as follows:

$$Na^+ + OH^- + H_3BO_3 \rightleftharpoons Na^+ + B(OH)_4^-$$

A further reaction in the spray tower is evaporation of water from droplets containing $NaB(OH)_4$ and dehydration of $NaB(OH)_4$ to $NaBO_2$:

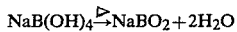

$$NaB(OH)_4 \rightarrow NaBO_2 + 2H_2O$$

The resulting $NaBO_2$ is a temperature stable solid which is collectable by an electrostatic precipitator or in a baghouse.

It is preferred that conditions in the spray tower be adjusted so that the non-volatile boron compounds formed are dry, that is, that the tower be operated as a dry bottom tower in which all water is evaporated off the exit gases to avoid sludge and corrosion and to permit collection of dry solids directly.

The amount of NaOH or strong base used is preferably that calculated to convert at least 98% of the condensable boron oxides or boric acids to non-volatile boron compounds, expressed for the sake of simplicity as $B(OH)_4^-$. This will correspond to a 50:1 ratio of $B(OH)_4^-:H_3BO_3$. However, it will be understood that a lower degree of conversion may be appropriate under selected circumstances.

The amount of strong base employed to achieve a preselected degree of conversion to condensable boron compounds will depend on the form of boron compounds in the inlet stream. For example, conversion of $H_3BO_3$ to $NaB(OH)_4$ will require 0.646 lb. of NaOH per pound of $H_3BO_3$ if quantitative conversion to $NaB(OH)_4$ is assumed. By quantitative conversion is meant reaction of all available boron containing anions with the cations of the strong base.

During actual test runs it does not appear that the reaction is necessarily quantitative. However, it has been found that satisfactory results have been obtained using an excess of strong base over that required for a quantitative reaction, e.g., 1.25 to 3 times the quantity needed for the quantitative reaction.

The stack gases entering the effluent treating system will generally be hotter than about 1000° F. In the spray tower, the gases are cooled to a temperature above about 250° F., preferably to 300°–800° F.

The non-volatile boron compounds produced in the spray tower can be removed by otherwise conventional methods. However, electrostatic precipitation is preferred.

It is sometimes desired to pre-cool the high-temperature stack gases to a temperature below about 1300° F., but above about 300° F., before the gases are treated with strong base solution in the spray tower. This conveniently accomplished in a recuperator in heat exchange relationship with incoming gases for the glass melting or other process yielding the boron-containing stack gases.

The overall preferred process is shown in FIG. 1, the individual steps of which are carried out in the recuperator, spray tower and electrostatic precipitator.

With respect to the apparatus of this invention, the preferred embodiments will be as set forth above in the context of the process. In addition, the apparatus can be in series with and downstream of means for removal of gases more acidic than boron oxides or boric acids prior to the means for cooling the stack gases to a temperature above about 250° F. and converting condensable boron oxides and boric acids to non-volatile boron compounds.

DESCRIPTION OF THE PREFERRED EMBODIMENTS

The preferred process conditions are those as above wherein the stack gases are pre-cooled to a temperature below about 1300° F. and then cooled to a temperature about 300°–800° F., the strong base is sodium hydroxide in an amount calculated to convert at least 98% of the condensable boron oxides or boric acids to non-volatile boron compounds and the non-volatile boron compounds thus formed are dried prior to collection from the cooled gases and are removed by electrostatic precipitation.

The preferred apparatus is as above, wherein the means for cooling the stack gases and converting condensable boron oxides and boric acids to non-volatile boron compounds is a spray tower for spraying incoming stack gases with an aqueous solution of a strong base; the means for collecting and removing non-volatile boron compounds formed in the means for cooling the stack gases to a temperature above about 250° F. and converting condensable boron oxides and boric acids to non-volatile boron compounds is an electrostatic precipitator; and the means for venting the ecologically-acceptable effluent gases to the atmosphere is a stack and wherein is provided means for pre-cooling incoming high temperature stack gases to a temperature below about 1300° F. comprising a recuperator in heat exchange relationship with incoming gases for the process producing the contaminated stack gases.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Fahrenheit; unless otherwise indicated, all parts and percentages are by weight.

Studies were run on the stack gases from a plant making fiber glass reinforcement of "E" glass, which is an alkaline earth borosilicate of which the following composition is typical:

|  | % |
|---|---|
| $SiO_2$ | 54.5 |
| $Al_2O_3$ | 14.5 |
| CaO | 22.0 |
| $B_2O_3$ | 8.5 |
| $Na_2O$ | 0.5 |

High temperature flue gases entering the treatment system were analyzed for dust concentration and condensable boron in accordance with EPA Method 5, "Determination of Particulate Emissions from Stationary Sources," Federal Register, volume 24, no. 160, Thursday, Aug. 18, 1977. In the procedure used, gases being analyzed are pulled through a hot box filter, maintained at 250° F., for removal of solid particulates. The gaseous material passing through the filter is scrubbed with water in a series of three impinger tubes containing cold water and maintained at about 50° F. The condensables are condensed and water soluble materials collected in the impinger liquid, which is used for specified analyses. Boron was determined colorimetrically by the carmine method. The limits of accuracy of this method are 2 $\mu$g at 2 ml (0.5 ppm).

EXAMPLE 1

Stack gases containing 392.40 mg./$Nm^3$ of boron compounds (as B) and 352 mg./$Nm^3$ of total solids (condensables plus particulates) at 727° F. was treated in a spray tower with the product of a 12% solution of $Na_2CO_3$ and a 6% slurry of calcium hydroxide at a rate that 2.03 moles of alkali was used per mole of boron. The flow rate of the gases was 2.5 fps.

The sprayed gases were processed in a series of three electrostatic precipitators at an inlet temperature of 394° F. The voltage in the precipitators was 21.5–22 Kv and the amperage 12–17 ma. The outlet temperature of the gases was 350° F.

The total solids content of the vented gas was 20.6 mg./$Nm^3$ (94% removal of solids) and of boron was 66.06 mg./$Nm^3$ (83% removal). No plume was observed.

EXAMPLE 2

Inlet gas at 725° F., containing 597 mg./$Nm^3$ of total solids and 286.67 mg./$Nm^3$ of boron was treated as in Example 1 with a ratio of 1.96 of base to boron. The effluent from the spray tower, at 400° F., was passed into the electrostatic precipitator unit, in which the voltage was 22 Kv and the amperage 8–12 ma. The outlet temperature from the electrostatic precipitator was 350° F. The total solids content was 26 mg./$Nm^3$ (95% removed) and boron content 109.4 mg./$Nm^3$ (62% removed).

EXAMPLES 3–6

Tests were run as in Example 1 using varying combinations and ratios of strong base. The results in the accompanying table, indicate that more than about 80% of boron oxides and boric acids can be removed by the process of the invention.

In FIG. 2 are given the results of opacity determinations at the inlet and outlet of the electrostatic precipitator for the test of Example 5A. The horizontal coordinate is time in minutes and the vertical coordinate is % opacity. The measurements were made with a source cascade impactor (Model 226, Sierra Instruments Inc., 3756 North Dunlap St., St. Paul, Minn. 55112).

| Example | Inlet Gas T, °F. | Total Solids mg./$Nm^3$ | B mg./$Nm^3$ | Treatment Base | Base: B | Tower Outlet T, °F. | E.P. Conditions Kv | ma | E.P. Effluent Gases T, °F. | Total Solids mg./$Nm^3$ | B mg./$Nm^3$ | % Removed Total Solids | B |
|---|---|---|---|---|---|---|---|---|---|---|---|---|---|
| 3A | 760 | 1271 | 453.72 | 7% Ca(OH)$_2$ 15% NaOH | 20.8 | 497 | 19–20.7 | 8.1–10 | 418 | 186.6 | 49.06 | 85.3 | 89.2 |
| 3B | 713 | 1205 | 398.39 | 7% Ca(OH)$_2$ 15% NaOH | 2.09 | 401 | 22 | 8.5–10.5 | 350 | 244.0 | 62.37 | 79.8 | 84.4 |
| 3C | 730 | 1214 | 408.36 | 7% Ca(OH)$_2$ 15% NaOH | 1.87 | 298 | 22 | 6.5–11.8 | 268 | 71.7 | 59.87 | 94.1 | 85.4 |
| 3D | 750 | 1333 | 446.22 | 7% Ca(OH)$_2$ 15% NaOH | 1.52 | 243 | 22 | 4.9–6.2 | 236 | 154.0 | 71.83 | 88.5 | 84.0 |
| 4A | 754 | 663.8 | 353.61 | 15% NaOH | 0.97 | 495 | 20–21 | 11–17 | 418 | 177.83 | 109.17 | 73.2 | 69.1 |
| 4B | 780 | 1452.9 | 404.22 | " | 1.4 | 498 | 19–20.7 | 12–23 | 417 | 292.69 | 77.02 | 79.8 | 81.0 |
| 5A | 800 | 1402.4 | 437.98 | " | 2.17 | 489 | 20.5–21.5 | 10–17 | 418 | 225.92 | 79.49 | 83.9 | 81.9 |
| 5B | 846 | 1387.4 | 444.07 | " | 2.17 | 499 | 19–21.7 | 14–25 | 414 | 279.70 | 87.85 | 79.8 | 80.2 |
| 6A | 810 | 1347.6 | 423.32 | " | 1.67 | 400 | 20–21.5 | 10–35 | 354 | 179.03 | 46.31 | 86.7 | 89.1 |
| 6B | 780 | 1222.0 | 431.67 | " | 1.57 | 302 | 22 | 5–11 | 290 | 24.88 | 34.14 | 98.0 | 92.1 |

EXAMPLES 7-9

Comparative tests using treatment with materials other than strong bases, as set forth above, were made. These tests, as tabulated below, indicate that at least some strong base, e.g., NaOH, is required for conversion of condensable boron compounds to materials collectable at temperatures above about 300° F. In each of these cases, a detached plume was observed.

| Example | Inlet Gas T, °F. | Total Solids mg./Nm³ | B mg./Nm³ | Treatment Base | Base:B | Tower Outlet T, °F. | E.P. Conditions Kv | ma | E.P. Effluent Gases T, °F. | Total Solids mg./Nm³ | B mg./Nm³ | % Removed Total Solids | B |
|---|---|---|---|---|---|---|---|---|---|---|---|---|---|
| 7A | 730 | 1187 | 313.74 | 15% Na₂CO₃ | 2.27 | 497 | 18-21 | 6-17 | 410 | 691 | 271.41 | 41.8 | 13.5 |
| 7B | 750 | 1897 | 315.01 | " | 1.97 | 398 | 21-22 | 16-27 | 332 | 1209 | 147.90 | 36.3 | 53.5 |
| 8A | 742 | 1940 | 237.80 | 7% Ca(OH)₂ | 2.02 | 543 | 12.5-14 | 17-23 | 468 | 1782 | 198.89 | 8.1 | 16.4 |
| 8B | 755 | 1867 | 358.83 | " | 1.34 | 390 | 12-14 | 34-38 | 358 | 1917 | 246.62 | 0 | 31.3 |
| 8C | 767 | 1117 | 348.78 | " | 1.25 | 302 | 16-18 | 20-22 | 278 | 970 | 163.01 | 13.2 | 53.3 |
| 8D | 727 | 1638 | 361.64 | " | 2.03 | 197 | 22 | 6-9 | 187 | 53.9 | 83.68 | 96.7 | 76.9 |
| 9 | 730 | 1270 | 353.41 | 15% NH₄OH | 3.08 | 466 | 19-20 | 9-14 | 396 | 1376 | 193.32 | 0 | 45.3 |

EXAMPLE 10

The nature of the recovered hopper dust from runs done as in Example 1, using pretreatment with 15% NaOH solution at various ratios of NaOH:B at a flow rate of 2.5 fps and a precipitator inlet temperature of 500° F. The results are those obtained from duplicate runs on samples of equal amounts taken from each of the hoppers of the three electrostatic precipitators.

The following results were obtained:

| Sample | NaOH:B | Sodium Metaborate (NaBO₂) | Sodium Tetraborate (Na₂B₄O₇) | Sodium Hydroxide (NaOH) | Boric Acid (H₃BO₃) |
|---|---|---|---|---|---|
| A | 2 | 49.3% | — | 24.5% | — |
| B | 2 | 46.3% | 24.5% | — | — |
| C | 2 | — | 69.1% | — | 2.84% |
| D | 1 | 61.9% | — | 8.29% | — |
| E | 1 | 61.9% | 7.44% | — | — |
| F | 1 | — | 49.0% | — | 18.9% |
| G | 3 | 45.5% | — | 26.7% | — |
| H | 3 | 57.7% | — | 11.6% | — |
| I | 3 | — | 56.3% | — | 10.0% |

EXAMPLE 11

For the sake of comparison, the hopper dust from an untreated stack gas sample, cooled to 150° F. by spraying with water and with dilution air and introduced to the electrostatic precipitators at a flow rate of 2.5 fps was analyzed as in Example 10.

Results were:

| Compound | Percent by Weight Sample A | Sample B | Sample C |
|---|---|---|---|
| Silica (SiO₂) | 1.88 | 1.78 | 2.24 |
| Calcium Oxide (CaO) | 0.80 | 1.04 | 1.22 |
| Carbon Dioxide (CO₂) | 2.11 | 2.95 | 2.84 |
| Aluminum Oxide (Al₂O₃) | 0.0 | 0.0 | 0.0 |
| Borate (B₂O₃) | 52.8 | 41.0 | 56.6 |
| Sodium (Na) | 6.17 | 9.06 | 8.46 |
| Sulfate (SO₄⁼) | 12.2 | 23.1 | 10.4 |
| Iron Oxide (Fe₂O₃) | 3.62 | 9.4 | 4.59 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for treating high-temperature stack gases contaminated with condensable boron oxides or boric acids to produce ecologically-acceptable effluent gases comprising the steps of:
   (a) simultaneously cooling the stack gases to a temperature about 300°-800° F. and converting condensable boron oxides and boric acids to non-volatile boron compounds by spraying the stack gases with an aqueous solution of a strong base;
   (b) collecting and removing by electrostatic precipitation the thus-formed non-volatile boron compounds from the cooled gases and
   (c) venting the resulting ecologically-acceptable effluent gases to the atmosphere.

2. The process of claim 1, wherein the strong base is sodium hydroxide.

3. The process of claim 12, wherein the strong base is used in an amount calculated to convert at least 98% of the condensable boron oxides or boric acids to $B(OH)_4^-$.

4. The process of claim 1, wherein the non-volatile boron compounds formed are dried prior to collection from the cooled gases.

5. The process of claim 1, wherein the ecologically-acceptable effluent gases have a boron content of less than 65 mg./Nm³.

6. The process of claim 1, wherein the high-temperature stack gases are pre-cooled to a temperature below about 1300° F. prior to cooling to above about 300°-800° F. and conversion of condensable boron oxides and boric acids to non-volatile boron compounds.

7. The process of claim 1, wherein the stack gases are pre-cooled to a temperature below about 1300° F. and then cooled to a temperature of about 300°-800° F., the strong base is sodium hydroxide in an amount calculated to convert at least 98% of the condensable boron oxides or boric acids to non-volatile boron compounds and the non-volatile boron compounds thus formed are dried prior to collection from the cooled gases and are removed by electrostatic precipitation.

8. The process of claim 7, wherein the ecologically-acceptable effluent gases have a boron content of less than 65 mg./Nm³.

* * * * *

UNITED STATES PATENT AND TRADEMARK OFFICE
CERTIFICATE OF CORRECTION

PATENT NO. : 4,325,922
DATED : April 20, 1982
INVENTOR(S) : Mark A. Bryant

It is certified that error appears in the above-identified patent and that said Letters Patent are hereby corrected as shown below:

In Table I, under Base: B, line 1, "20.8" should read --2.08--.

Column 8, line 41, "claim 12" should read --1--.

Signed and Sealed this

Third Day of August 1982

[SEAL]

Attest:

GERALD J. MOSSINGHOFF

Attesting Officer

Commissioner of Patents and Trademarks